United States Patent [19]

Triezenberg

[11] Patent Number: 5,580,221
[45] Date of Patent: Dec. 3, 1996

[54] MOTOR DRIVE CIRCUIT FOR PRESSURE CONTROL OF A PUMPING SYSTEM

[75] Inventor: David M. Triezenberg, Ft. Wayne, India.

[73] Assignee: Franklin Electric Co., Inc., Bluffton, India.

[21] Appl. No.: 318,232

[22] Filed: Oct. 5, 1994

[51] Int. Cl.⁶ .................................................. F04B 49/06
[52] U.S. Cl. .............................................. 417/44.2; 417/12
[58] Field of Search ............................... 417/12, 22, 38, 417/44.2; 318/481, 164; 361/23

[56] References Cited

U.S. PATENT DOCUMENTS

| | | |
|---|---|---|
| 2,440,981 | 5/1948 | Smith . |
| 3,013,186 | 12/1961 | Jones . |
| 3,136,924 | 6/1964 | Futral et al. . |
| 3,141,998 | 7/1964 | Silkman . |
| 3,551,072 | 12/1970 | Zimmerly . |
| 3,685,926 | 8/1972 | Blum . |
| 3,692,430 | 9/1972 | Timmons . |
| 3,719,860 | 3/1973 | Lawrence . |
| 3,855,515 | 12/1974 | Hutchins, Jr. . |
| 3,985,467 | 10/1976 | Lefferson . |
| 4,037,045 | 7/1977 | Beriger et al. . |
| 4,051,509 | 9/1977 | Beriger et al. . |
| 4,093,971 | 6/1978 | Chu et al. . |
| 4,102,394 | 7/1978 | Botts . |
| 4,120,019 | 10/1978 | Arii et al. . |
| 4,145,161 | 3/1979 | Skinner . |
| 4,155,402 | 5/1979 | Just . |
| 4,196,775 | 4/1980 | Groh . |
| 4,204,246 | 5/1980 | Arii et al. . |
| 4,225,290 | 9/1980 | Allington . |
| 4,247,260 | 1/1981 | Schonwald et al. . |
| 4,257,395 | 3/1981 | Wieder . |
| 4,281,968 | 8/1981 | Akers . |
| 4,284,943 | 8/1981 | Rowe ...................................... 318/806 |
| 4,329,120 | 5/1982 | Walters . |
| 4,344,741 | 8/1982 | Taki . |
| 4,396,353 | 8/1983 | McDonald . |
| 4,397,610 | 8/1983 | Krohn . |
| 4,433,219 | 2/1984 | Dietz . |
| 4,442,953 | 4/1984 | Miyamoto et al. . |
| 4,460,355 | 7/1984 | Layman .................................. 604/118 |
| 4,532,893 | 8/1985 | Day et al. . |
| 4,627,243 | 12/1986 | Schaub . |
| 4,678,404 | 7/1987 | Lorett et al. . |
| 4,686,439 | 8/1987 | Cunningham et al. . |
| 4,733,152 | 3/1988 | Allington . |
| 4,788,448 | 11/1988 | Crowe ...................................... 307/31 |
| 4,795,314 | 1/1989 | Prybella et al. . |
| 4,805,118 | 2/1989 | Rishel ...................................... 364/510 |
| 4,834,624 | 5/1989 | Jensen et al. . |
| 4,840,068 | 6/1989 | Mayhew, Jr. . |
| 4,841,404 | 6/1989 | Marshall et al. . |
| 4,874,294 | 10/1989 | Karg . |
| 4,987,953 | 1/1991 | Hedstrom . |

(List continued on next page.)

FOREIGN PATENT DOCUMENTS 0004056 9/1979 European Pat. Off. .
0390627 10/1990 European Pat. Off. .

Primary Examiner—Timothy S. Thorpe
Assistant Examiner—Xuan M. Thai
Attorney, Agent, or Firm—Marshall, O'Toole, Gerstein, Murray & Borun

[57] ABSTRACT

This disclosure relates to a liquid supply system including a motor-pump unit designed for installation in a liquid supply such as a well or storage tank. The unit supplies the liquid to a supply pipe, and a pressure sensor connected to the pipe is operable to provide a control signal representative of the liquid pressure in the pipe. The motor is a variable-speed AC motor. A control for the motor is responsive to the control signal and actuates a power circuit to drive the motor at a speed adjusted to maintain the liquid pressure at a substantially constant value. The control circuit further includes means for turning off the power to the motor in the absence of flow through pipe, which does not require a flow sensor. The power circuit comprises a DC link including a rectifier and an inverter. The rectifier is located adjacent the pressure sensor; the inverter may be located adjacent the rectifier and the pressure sensor or in the casing of the motor-pump unit.

9 Claims, 3 Drawing Sheets

U.S. PATENT DOCUMENTS

| | | |
|---|---|---|
| 5,015,151 | 5/1991 | Snyder, Jr. et al. . |
| 5,040,126 | 8/1991 | Allington . |
| 5,064,347 | 11/1991 | LaValley, Sr. . |
| 5,092,824 | 3/1992 | Connett ................................... 417/212 |
| 5,145,323 | 9/1992 | Farr . |
| 5,197,859 | 3/1993 | Siff . |
| 5,238,369 | 8/1993 | Farr . |
| 5,240,380 | 8/1993 | Mabe . |
| 5,244,350 | 9/1993 | Yang . |
| 5,282,722 | 2/1994 | Beatty . |

– 5,580,221 –

MOTOR DRIVE CIRCUIT FOR PRESSURE CONTROL OF A PUMPING SYSTEM

FIELD AND BACKGROUND OF THE INVENTION

This invention relates generally to a liquid supply system, and more specifically, it relates to a system for supplying a liquid at a substantially constant pressure.

While the following description relates primarily to a domestic water supply system, it will be apparent that the invention is also applicable to other types of liquid supply systems.

A domestic water supply system in common use includes a motor-pump unit located in a water well, the unit being suspended by a pipe which also conveys the pumped water to the house. At the surface, the system further includes a storage-pressure tank which receives the pumped water and is connected to the plumbing of the house. A water pressure actuated switch is mounted adjacent to the tank through which electric power is supplied to the motor. Hysteresis in the operation point of this switch establishes an operating pressure range for the tank and water supply system. The electric motor is a constant speed type and the pump is usually a centrifugal type. The storage tank is relatively large (usually about 15 to 30 gallons) and stores a sizable amount of water, so that the motor does not have to be turned on and off frequently.

Systems similar to the foregoing have included a jet pump in place of the centrifugal pump, and this arrangement is useful with relatively small diameter pipes. However, jet pumps are usually avoided because they have a lower efficiency than centrifugal pumps.

Another type of water supply system includes a variable speed motor and a centrifugal pump. The power supply for the motor includes a DC link electronic package which varies the motor speed in response to the water pressure. In another type of system, an electronic package is part of the motor-pump unit so that the heat-generating electronic package may be cooled by the well water. Systems including a pressure sensor and a variable speed motor and designed to supply water at a substantially constant pressure have also been provided. Such systems have been used as pressure boosters in relatively tall buildings in some areas (usually outside the United States).

It is a general object of the present invention to provide a system for supplying a liquid at a substantially constant pressure which is an improvement over the foregoing systems.

SUMMARY OF THE INVENTION

This invention relates to a liquid supply system including a motor-pump unit designed for installation in a liquid supply such as a well or storage tank. The unit supplies the liquid to a supply pipe, and the invention further comprises a pressure sensor connected to the pipe and operable to provide a control signal representative of the liquid pressure in the pipe. The motor is a variable-speed AC motor, and the invention still further comprises a control for the motor, the control being responsive to the control signal and actuating a power circuit to drive the motor at a speed selected to maintain the liquid pressure at a substantially constant value. The control circuit includes means for turning off the power to the motor in the absence of flow through pipe, which does not require a flow sensor. The power circuit comprises a DC link including a rectifier and an inverter. The rectifier is located adjacent the pressure sensor; the inverter may be located adjacent the rectifier and the pressure sensor or in the casing of the motor-pump unit.

DETAILED DESCRIPTION

Figure 1:
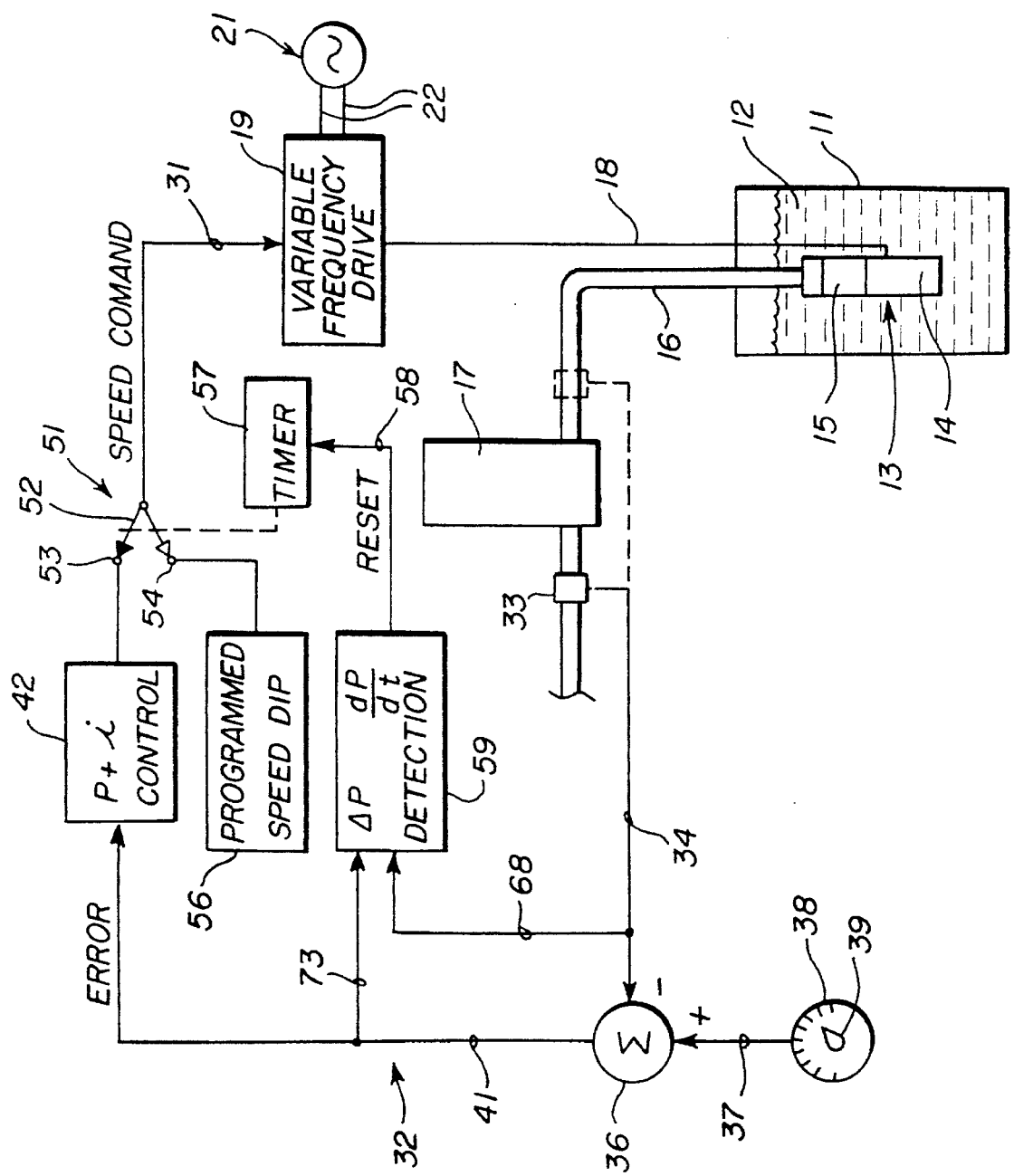
FIG. 1 is a schematic illustration of a liquid supply system embodying the invention.

FIG. 1 illustrates a liquid supply system, in accordance with the invention. An underground storage tank 11 contains a liquid 12 to be pumped at a substantially constant pressure, and a motor-pump unit 13 is mounted in the tank 11. While FIG. 1 shows a closed tank, it may instead be another type of reservoir such as a well. The unit 13 includes an electric motor 14 and a pump 15 which, when driven by the motor 14, pumps the liquid through a pipe 16, and a pressure tank or accumulator 17 is connected in the pipe 16. The motor 14 is a conventional variable speed AC motor, and the pump 15 may be a conventional centrifugal pump. A conventional one-way check valve is usually provided in the pipe 16 or between the pump and the pipe. Electrical power to drive the motor 14 is supplied through a drop cable 18 connected between the motor 14 and a variable frequency drive or power circuit 19.

Figure 3:
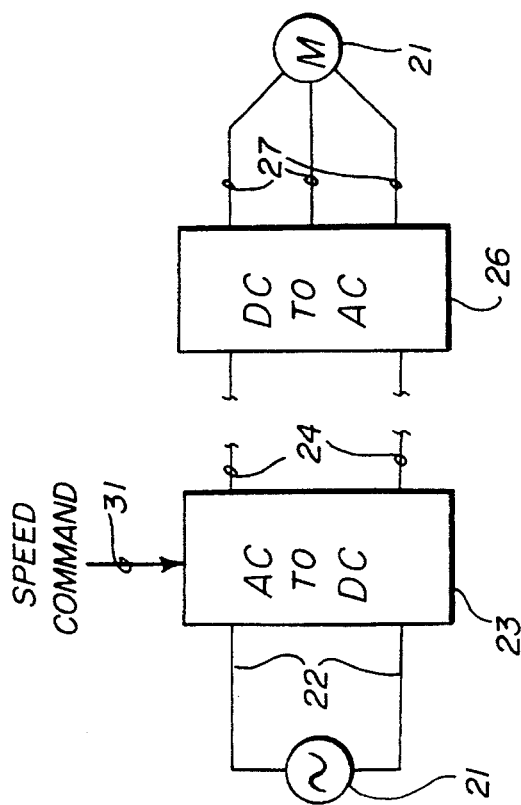
FIG. 3 is a block diagram of a power circuit of the system shown in FIG. 1.

The drive circuit 19 may comprise a conventional DC link arrangement as illustrated in FIG. 3. A standard 60-cycle AC supply 21 is connected by conductors 22 to a rectifier circuit 23 which produces a DC voltage on lines 24. An inverter 26 is connected to the lines 24 and converts the DC voltage to a three-phase variable frequency AC supply voltage on polyphase lines 27, and the motor 21 is connected to the lines 27. In the embodiment of the invention shown in FIG. 1, the three lines 27 form the drop cable 18.

Figure 2:
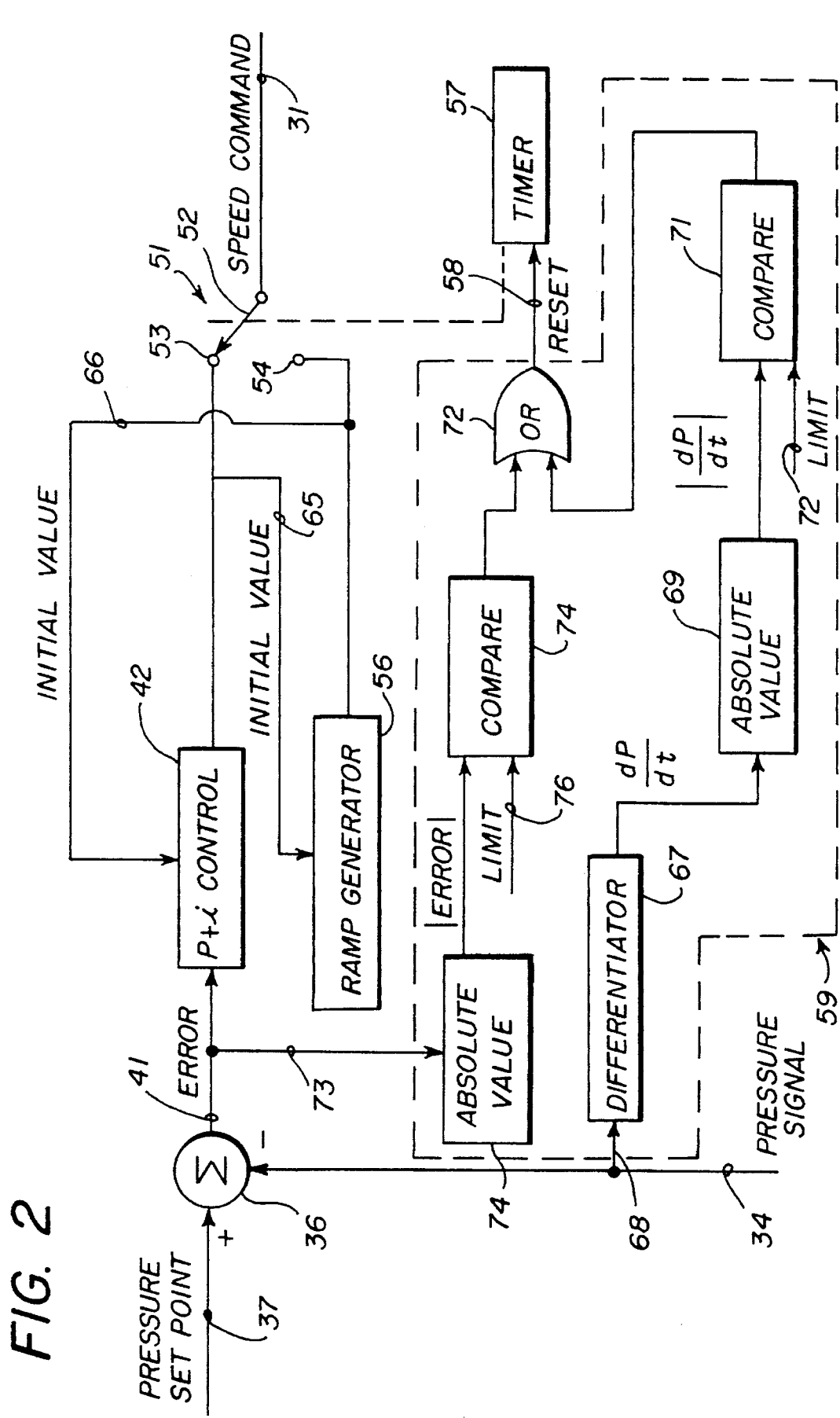
FIG. 2 is a block diagram of a control circuit of the system shown in FIG. 1.

The frequency of the supply voltage on the lines 27 is controlled by an electrical speed command signal on a line 31, shown in FIGS. 1 to 3, formed by a control circuit 32 (FIGS. 1 and 2). With reference first to FIG. 1, the control circuit 32 includes a pressure sensor 33 which supplies pressure signal representing the liquid pressure in the pipe 16. The sensor 33 may be mounted in the pipe 16 downstream from the tank 17 as shown by the solid lines or upstream from the tank 17 as shown by the dashed lines, for example. The pressure signal appears on a line 34 that is connected to a summation point or circuit 36 which also receives a set point signal on a line 37. A set point circuit 38 generates the set point signal in accordance with the setting of a dial 39, the setting being at a desired liquid pressure in the pipe 16. The summation circuit combines the signals on the lines 34 and 37 and produces an error signal on a line 41 which represents the deviation of the actual pressure in the pipe from the desired or preset pressure.

The error signal is connected by the line 41 to a conventional p+i (proportional plus integral) controller 42 of a type which is known to those skilled in this art. The controller 42 generates a speed command signal derived from the error signal, and the speed command signal is connected by the line 31 to control the drive 19. Thus, the liquid pressure in the pipe 16 is a function of the speed of the motor-pump unit 13, the speed of the unit 13 is a function of the frequency of the drive 19, which, in turn, is a function of the speed command signal and the error signal.

The foregoing describes the normal operation of the system when the pipe 16 is opened to allow flow out of the pipe 16. Such flow causes the pressure to start to drop, thereby generating error and speed command signals which cause the unit 13 to pump liquid. The quantity of liquid pumped is essentially equal to the quantity being dispensed from the pipe 16, thereby maintaining the liquid pressure essentially constant at the selected level.

If only the portion of the control circuit 32 described thus far were provided, a problem may be encountered when the pipe 16 is closed and the flow of liquid stops. The motor-pump unit 13 is preferably operated only when there is flow out of the pipe 16 which should be replaced. A feedback control loop as described above is not able to recognize a condition where the flow has stopped because it senses pressure only and does not include a flow sensor for sensing liquid flow. Consequently, the system will attempt to continue normal operation and maintain pressure regulation.

To turn of the unit 13 when flow out of the pipe 16 has stopped, without utilizing a flow sensor (which is an expensive item that would also have to be connected in the pipe 16), the control circuit is constructed in accordance with this invention to sense when the flow has stopped, utilizing only the pressure sensor 33. Broadly stated, this is accomplished by periodically reducing the speed of the motor. If there is continued flow out of the pipe 16, the pressure at the sensor 33 immediately drops when the motor slows down; this pressure drop is sensed and is utilized to return the motor to a higher speed necessary to maintain a constant pressure. On the other hand, if there is no flow out of the pipe 16, the pressure does not drop when the motor slows down. This condition is recognized and utilized to turn off the power to the motor; the motor remains off until the pressure starts to drop due to subsequent flow out of the pipe 16.

More specifically, a switch 51 is connected between the control 42 and the line 31. While the drawing shows a mechanical two-position switch 51, an electronic switching circuit may be used instead. The switch 51 includes a movable contact 52, a stationary normal contact 53 connected to the control 42, and a stationary dip contact 54 connected to a programmed speed dip circuit 56. When in the solid and dashed line positions, the switch 51 connects the control 42 or the speed dip circuit 56, respectively, to the drive 19. The circuit 56 is programmed to ramp down the speed of the motor 14 to zero.

The position of the switch 51 is controlled by a timer 57. The contact 52 has the normal position shown by the solid line in FIG. 1, but periodically the contact 52 is moved by the timer 57 to the test position shown by the dashed line. The timer 57 is connected by a line 58 to receive a reset signal from a pressure monitoring circuit 59 which receives the pressure signal on the line 34. The circuit 59 is responsive to a change ($\Delta P$) in the liquid pressure, and it also forms the time derivative ($dp/dt$). The presence of either a pressure change ($\Delta P$) or the derivative ($dp/dt$) produces a reset signal on the line 58, which resets the timer 57 and moves the contact 52 back to the normal solid line position.

To summarize the operation of the system shown in FIG. 1, assume that the unit 13 is initially turned off, that the pressure in the pipe 34 is at the desired level, and that the switch 51 is in the normal position. When the pipe 16 is opened to allow flow of the liquid out of the pipe, the pressure immediately starts to drop, resulting in an error signal on the line 41 and a speed command signal on the line 31. The control 42 and the drive 19 (which include conventional ramp circuits) then power the unit 13 at a speed which returns the pipe 34 pressure to the value set in the circuit 38. The feedback circuit operates to move the error signal toward zero; in other words, the speed of the unit 13 is such that it pumps the liquid at the rate at which it flows out of the pipe 34, thereby maintaining the pipe pressure at a substantially constant value.

At the end of the period of the timer 57, the timer moves the switch contact 52 to the speed dip circuit 56 which causes the speed of the unit 13 to slow down. If the liquid is still flowing out of the pipe 34, the slowdown of the unit 13 causes the monitoring circuit 59 to produce both a pressure change ($\Delta P$) signal and a derivative ($dp/dt$) signal, either one of which causes a reset signal on the line 58 to immediately reset the timer 57 and to return the switch 51 to the normal position. The speed of the unit 13 immediately increases to return the pressure to the preset value. The length of time for the switch to move from the normal to the test position and return to the normal position is very short so that the drop in pressure is nearly imperceptible. At the end of each timer 57 period (which may, for example, be about 10 seconds), the foregoing test procedure is repeated so long as flow continues out of the pipe 16.

On the other hand, if the pipe 16 is closed to stop the flow out of the pipe, the unit 13 will slow down, but may not stop (a centrifugal pump or a jet pump may enable the unit 13 to continue without flow out of the pipe 34). When the timer 57 moves the switch 51 to the test position, the monitoring circuit 59 will not generate a reset signal because the pipe pressure does not drop. Consequently, the timer 57 will not be reset, and the switch 51 will remain in the reset position. As previously mentioned, the circuit 56 includes a ramp circuit for ramping the drive 19 down to zero frequency and the unit 13 down to zero speed. The system will remain in this condition until the pipe 16 is subsequently opened to allow liquid flow, causing the generation of a reset signal, resetting of the timer 57, and movement of the switch 51 to the normal position. Operation then continues as described above.

The circuit shown in FIG. 2 is a more detailed version of part of the circuit shown in FIG. 1, and the same reference numerals are used for the corresponding parts. The speed dip circuit 56 is formed by a ramp generator which will ramp the motor speed to zero if the timer 57 is not reset, A line 65 connects the output of the control 42 to the generator 56 so that the generator 56 is initialized with the control 42 signal. This prevents a step change in the motor speed when the switch 51 moves to the test position. Similarly, a line 66 connects the output of the generator 56 to the control 42 in order to initialize it and prevent a step change when the switch 51 moves to the normal position.

The pressure monitoring circuit 59 includes a differentiator circuit 67 connected by a line 68 to receive the liquid pressure signal from the sensor 33. The differential of the pressure signal is fed to an absolute value circuit 69, and the absolute value is fed to a comparator circuit 71 where it is compared with a limit signal on a second input 72. If the absolute value is greater than the limit signal, the comparator 71 passes a signal through an OR circuit 72 to reset the timer 57.

Similarly, the error signal on the line 41 is connected by a line 73 to an absolute value circuit 74, and the absolute value error signal is fed to one input of a comparator circuit 74. A limit signal is fed on a second input 76 to the comparator 74, and if the error signal exceeds the limit value, the comparator 74 sends a signal through the OR circuit 72 to reset the timer 57.

It will be apparent that either an excessive change of pressure signal or an excessive rate of change of pressure signal will reset the timer. The former is more likely to occur if the accumulator tank 17 is relatively large, whereas the latter is more likely to occur if the tank 17 is relatively small. A water tank for a typical domestic house may be about three gallons when using a system in accordance with this invention, whereas tanks in common use with most domestic water supplies are about 15–30 gallons. The size of tanks for other uses will depend upon the quantity of liquid normally being pumped.

Figure 4:
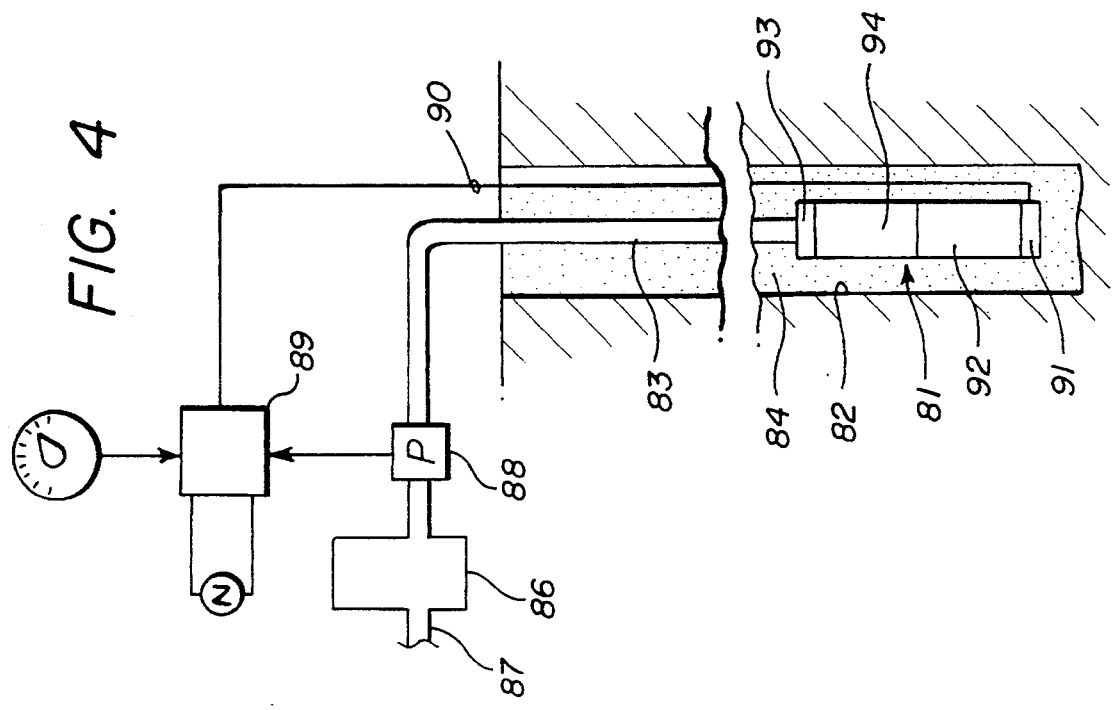
FIG. 4 is an illustration of an alternative embodiment of the invention.

FIG. 4 illustrates an alternative embodiment of the invention, including a motor-pump unit 81 suspended in a well 82 by a pipe 83. The pipe 83 conveys pumped liquid 84 (such as water) to a pressure/storage tank 86 and to a pipe 87 of a domestic plumbing system. A pressure sensor 88 is connected in the pipe 83, and a control module 89 controls the power to an electric motor of the unit 81.

The control module 89 includes the AC to DC rectifier 23 shown in FIG. 3 and the control circuit shown in FIGS. 1 and 2. The system of FIG. 4 includes a drop cable 90 which connects the control module 89 with the unit 81. In this system, the cable 90 is formed by the two wires 24 of the DC link, and the DC to AC inverter 26 is contained in a casing 91 that is part of the unit 81. The variable frequency output of the inverter 26 is connected to the adjacent motor 92 of the unit 81.

The arrangement shown in FIG. 4 has a number of advantages. The drop cable 90 has only two wires instead of three as in the system of FIGS. 1 to 3; the inverter 26 is closely adjacent the motor and it may be cooled relatively easily by the well water; and the rectifier 23 is readily accessible and is adjacent the pressure sensor at the ground surface.

The pressure sensor, the DC link, and the control circuit of FIGS. 1 to 3 may be mounted on the pipe 16, as described in the pending patent application of Jimmy Cochimin titled Liquid Pumping System, filed simultaneously herewith. In the system of FIG. 4, the pressure sensor and the control module 89 may be mounted on the pipe 83 as described in the above Cochimin pending patent application. The disclosure of the above pending patent application is incorporated herein by reference.

While the drawings and the description disclose a control including electronic components, the control could instead be implemented with a programmed microcontroller, whereby the circuits are replaced by calculations and the contacts replaced by branches of program logic.

A system constructed in accordance with this invention has numerous advantages as compared with conventional systems. It may easily be connected in a supply system because it includes a pressure sensor but does not require a flow sensor. The size of the pressure/storage tank (also referred to as an accumulator) is substantially less than that of a conventional supply system, thereby requiring less expense and space. Still further, the system provides liquid at a substantially constant pressure while the motor-pump unit is operating, thereby avoiding the pressure swings found in conventional domestic water supply systems. While the motor-pump unit is turned off, the system pressure will be maintained by a conventional check valve 93 (FIG. 4) which is normally provided between the pump 94 and the pipe 83. In the arrangement where the inverter is included in the motor and the rectifier is located above ground, only a two-wire drop cable carrying a variable DC voltage is needed. The wires carrying the pressure signal is connected to the rectifier which may be located close to the pressure sensor.

What is claimed is:

1. A liquid supply system comprising
   a) a motor-pump unit including a variable speed electric motor;
   b) a pipe connected to said unit for conveying liquid pumped by said unit;
   c) a pressure sensor connected to said pipe for providing a pressure signal representative of the liquid pressure in said pipe; and
   d) unit operating apparatus responsive to said pressure signal and connected to said unit for operating said unit, said apparatus comprising
      1) speed control means for operating said unit in a first mode wherein the speed of said unit is adjusted to maintain a substantially constant pressure in said pipe, said speed control means being connected to said pressure sensor and to said unit;
      2) speed change means for operating said unit in a second mode wherein the speed of said unit is reduced;
      3) pressure monitoring means responsive to said pressure sensor for providing an indication of a drop of pressure in said pipe; and
      4) intermittent means connected to said monitoring means for normally operating said unit in said first mode, for intermittently operating said unit in said second mode, and for turning off said unit when said monitoring means fails to indicate a drop of pressure when said unit is operating in said second mode.

2. A system as set forth in claim 1, wherein said speed control means includes means for providing a setting of a desired pressure in said pipe, means for combining said setting with pressure signal to form an error signal, and a control circuit for adjusting said speed of said unit to substantially eliminate said error signal.

3. A system as set forth in claim 1, wherein said speed change means comprises a ramp generator circuit for reducing the speed of said unit to zero.

4. A system as set forth in claim 1, wherein said pressure monitoring means provides said indication of a drop of pressure and forms a second indication of the derivative with time of a drop of pressure.

5. A system as set forth in claim 4, wherein said pressure monitoring means further includes means for comparing said indication and said second indication with limits.

6. A system as set forth in claim 4, wherein said intermittent means comprises a resettable timer connected to be reset by either said indication or said second indication.

7. A system as set forth in claim 6, wherein said timer has a timing period during which said unit is operated in said first mode and said timer, said timer switching said unit to operation in said second mode at the end of said timing period, and said timer being reset by either said indication or by said second indication.

8. A system as set forth in claim 1, wherein said pipe is connected to a relatively small accumulator tank.

9. A liquid supply system comprising
   a) a motor-pump unit including a variable speed electric motor;
   b) a pipe connected to said unit for conveying liquid pumped by said unit;
   c) a pressure sensor connected to said pipe for providing a pressure signal representative of the liquid pressure in said pipe; and
   d) apparatus responsive to said pressure signal and to said unit for operating said unit, said apparatus comprising
      1) speed control means responsive to said pressure signal and connected to said unit for operating said unit to maintain a substantially constant pressure in said pipe;
      2) speed change means periodically connected to said unit for reducing the speed of said unit; and
      3) pressure monitoring means responsive to said pressure signal for turning off said unit if a periodic reduction in the speed of said unit does not produce a pressure drop.

* * * * *

UNITED STATES PATENT AND TRADEMARK OFFICE
CERTIFICATE OF CORRECTION

PATENT NO.   : 5,580,221
DATED        : December 3, 1996
INVENTOR(S)  : David M. Triezenberg Page 1 of 1

It is certified that error appears in the above-identified patent and that said Letters Patent is hereby corrected as shown below:

Column 3,
Line 24, after "To turn", delete "of" and insert -- off --.

Column 4,
Line 48, after "...reset", delete "," and insert -- . --.

Column 6,
Line 23, in claim 1, after "d)", delete "operating unit" and insert -- control --.
Line 54, claim 4, after "pressure and", delete "forms" and insert -- produces a derivative signal as --.
Lines 54-55, claim 4, after "indication of" delete "the derivative with time of".
Line 55, claim 4, after "a", delete "drop of".
Line 55, claim 4, after "pressure", insert -- drop --.
Line 57, claim 5, after "further includes", insert -- means for providing first and second signals representing limit values, and --.
Line 58, claim 5, after "indication with", delete "limits" and insert -- said first and second signals --.
Line 65, claim 7, after "first mode", delete "and said timer".

Column 7,
Line 11, claim 9, after "d)", insert -- control --.

Signed and Sealed this

Eighteenth Day of December, 2001

*Attest:*

*Attesting Officer*

JAMES E. ROGAN
*Director of the United States Patent and Trademark Office*